April 6, 1926.

A. PINEAU

WINDSHIELD WIPER

Original Filed Jan. 30, 1925  3 Sheets-Sheet 1

1,579,778

Witnesses:
W. P. Kilroy
Harry R. Lubitz

Inventor:
Auguste Pineau

April 6, 1926. 1,579,778
A. PINEAU
WINDSHIELD WIPER
Original Filed Jan. 30, 1925    3 Sheets-Sheet 2

Witnesses:
W. F. Kilroy
Harry R. L. White

Inventor:
Auguste Pineau
By Brown, Boettner, Brenner
Attys

April 6, 1926.  
A. PINEAU  
WINDSHIELD WIPER  
Original Filed Jan. 30, 1925  
1,579,778  
3 Sheets-Sheet 3
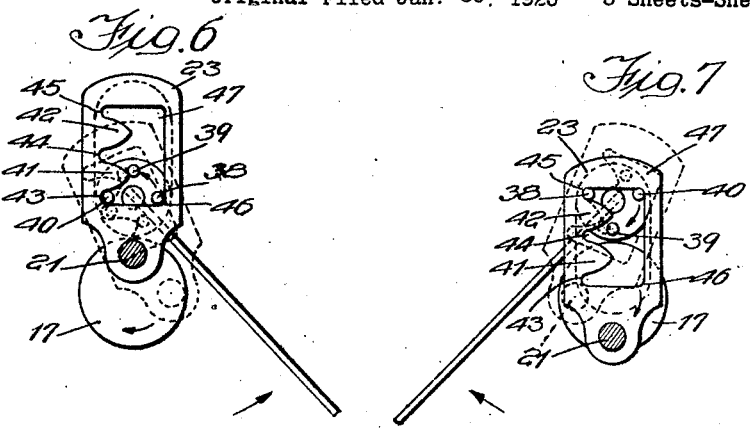
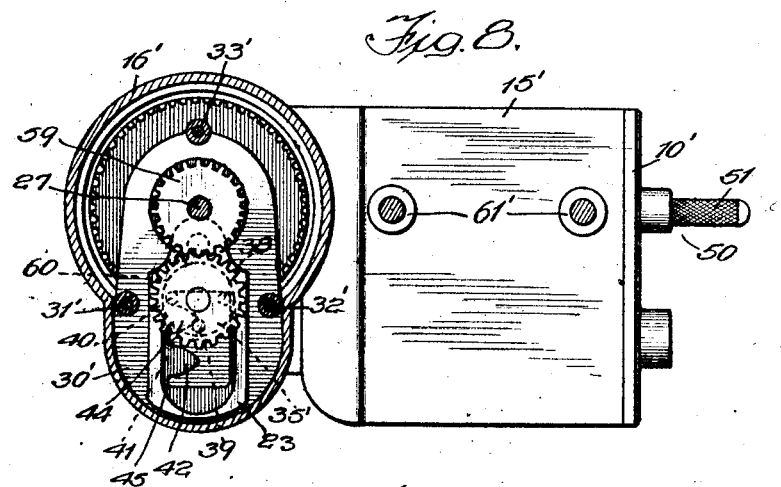
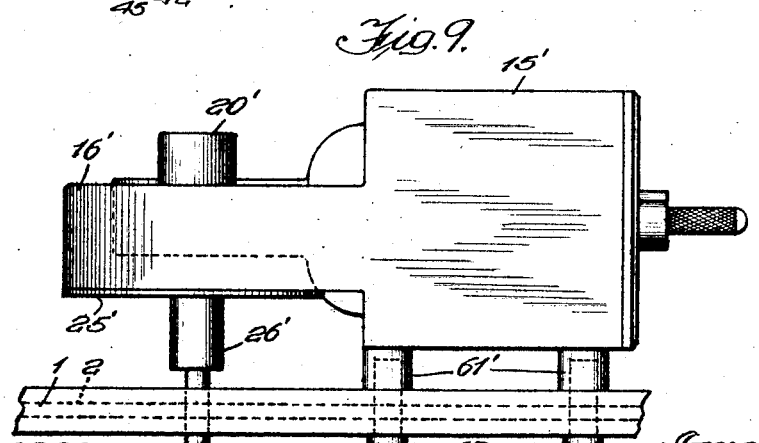
Inventor:  
Auguste Pineau Patented Apr. 6, 1926.

1,579,778

UNITED STATES PATENT OFFICE.

AUGUSTE PINEAU, OF CHICAGO, ILLINOIS.

WINDSHIELD WIPER.

Application filed January 30, 1925, Serial No. 5,684. Renewed February 25, 1926.

*To all whom it may concern:*

Be it known that I, AUGUSTE PINEAU, a citizen of the United States, residing at Chicago, in the county of Cook and State of Illinois, have invented a certain new and useful Improvement in Windshield Wipers, of which the following is a full, clear, concise, and exact description, reference being had to the accompanying drawings, forming a part of this specification.

My invention relates to wind shield wipers.

The use of a small electric motor for oscillating a wiper arm for cleaning the wind shield of an automobile, or the like, has been shown to be feasible. In such a device, the mechanism for converting rotary motion of the high speed motor shaft into slow oscillating motion of the wiper shaft is of the utmost importance.

Such motion should give a substantially smooth action without jerks or play, and should be simple, strong, and inexpensive.

I am aware that mechanisms for translating rotary motion into oscillating motion are old and I do not claim such broadly. I have, however, according to the present invention provided a structure of great simplicity and effectiveness which satisfactorily meets the requirements of a successful wind shield wiper.

While I have shown my improved mechanical motion in a wind shield wiper I wish it to be understood that I do not intend to limit the same to such use, but may employ it for uses such as washing machines, or any oscillating movement, as desired.

I provide a worm and wheel for reducing the rotary motion in speed. The worm wheel has a crank pin which drives a rack of novel design and the rack cooperates with a novel mutilated gear or pinion. The rack and gear together produce an oscillatory motion of the wiper shaft, which in the preferred form is something less than 180°, which is suitable for the wiper where the shaft for operating the same projects through the upper part of the frame of the wind shield, but the degree of angular motion may be varied from 0° to 360°. The rack of my invention needs no lateral guide except the pinion, suitable guiding action being thereupon provided and the pinion is made up of a disc from the side of which projects a plurality of pins serving as the teeth of a mutilated gear.

It is a notable fact that the mechanism of my invention provides maximum power at each end of the stroke of the wiper arm where the same is generally needed and yet the mechanism places a minimum of stress upon the individual element of the mutilated gear or pinion.

While I have above stated specifically the advantage of the mechanical motion for converting the rotary motion of the motor into a slow oscillatory motion of the wiper shaft, it is to be understood that the wiper of my invention, the preferred form of which is illustrated in the accompanying drawings, embodies other features of improvement which I do not wish to lose sight of.

Now in order to acquaint those skilled in the art with the manner of constructing and operating a device embodying my invention, I shall describe in connection with the accompanying drawings, a specific embodiment of the same.

In the drawings:

Figs. 6 and 7 are diagrams illustrating the operation of the mechanical movement of my invention;

Fig. 8 is a sectional view through a modification; and

Fig. 9 is a top plan view of the same.

Figure 1:
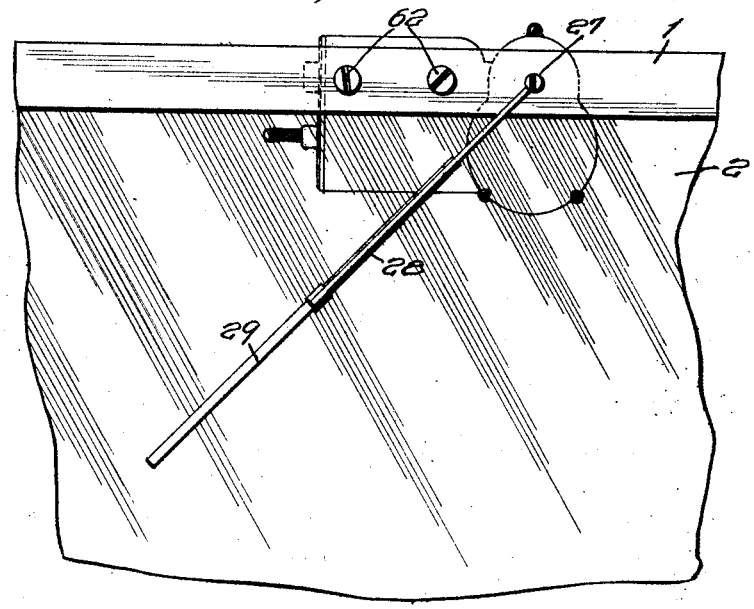
Figure 1 is a front view of the wiper applied to the top of the wind shield of an automobile.
Figure 2:
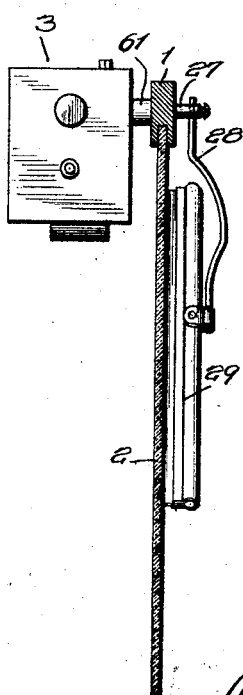
Fig. 2 is a left side view of the same.

The wiper is shown in Fig. 1 as mounted upon the top rail 1 of the frame of the wind shield, having the glass 2. The wiper 3 comprises an electric motor, shown in the sections of Figs. 4 and 5, having a suitable armature 3, field magnet 4, field winding 5, and brush holders 6 and 7, having suitable brushes for co-operating with the commutator 8. The motor shaft 9 has a bearing in the rear frame member 10, as indicated at 11. This motor shaft may project through the rear frame plate 10 and have a small knob to permit turning of the motor shaft by hand, if so desired. At its forward end the motor shaft is formed of a larger cross section, as may be seen at 12, and this enlarged portion has a bearing in the housing 13, which housing extends beyond the end of the shaft 12. The outer end of the shaft 12 is formed into a worm 14 which preferably has flat topped teeth, although the particular form of the worm is not of the essence of the invention. The rear part of the housing or end plate 10 co-operates with a central housing portion 15, which has the bearing portion 13 formed integral therewith. The bearing portion 13 extends downwardly, as viewed in Fig. 4, to form a housing 16 for the worm wheel 17, which worm wheel meshes with the worm 14.

Figure 3:
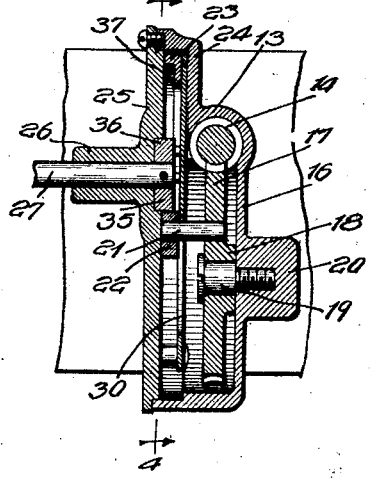
Fig. 3 is a vertical cross section taken on the line 3—3 of Fig. 4.

The worm wheel has a hub 18 which bears against the flat interior surface of the housing 16, and which hub is received upon a pin 19 which is threaded into a boss 20, the pin 19 being in the form of a shouldered screw for holding the worm wheel 17 firmly in place. The worm wheel 17 has the crank pin 21 extending from the forward face of the same and this crank pin enters the bearing 22 of the box slider 23. The housing 16 is extended axially of the worm wheel 17 to form a suitable enclosure for the crank pin 22 and its connected box slider 23, and this housing is also extended upwardly above the bearing portion 13 and above the worm 14, to provide a suitable housing for the outer end of the box slider 23, as is indicated at 24 in Fig. 3. A cover plate 25, having a bearing hub or boss 26, provides a bearing for the wiper shaft 27 to the outer end of which is secured the wiper arm 28 and wiper or squeegee 29. The cover plate 25 has a supplementary frame member 30 connected thereto by means of the posts or pillars 31, 32 and 33; this auxiliary frame or plate 30 having an opening 34 registering with the crank pin 21, this supplementary frame plate 30 being held upon the posts 31, 32 and 33 by means of suitable screws.

The supplementary frame plate 30 confines the box slider 23 between it and the cover plate 25, so that removal of the cover plate and box slider 23 and shaft 27, with connected parts, may be had as a unit.

At its inner end the wiper shaft 27 has a disc 35 connected thereto, this disc being preferably but not necessarily set in a recess or counterbore formed in the cover plate 25 to secure a bearing therein and said disc having an extending portion forming a male bearing 36, which bearing forms a pivotal guide for the corresponding female bearing 37 formed on the adjacent side of the box slider 23. The cylindrical guiding surface 36, which forms in effect a barrel, has rolling and sliding contact with the female bearing or guide 37, the latter being formed completely around the inside periphery of said box slider 23 for a depth corresponding to the axial length of the cylindrical surface 36. Thus the box slider 23 is guided at all times on the pivotal or cylindrical bearing formed on the surface 36 as the box slider is swung about by the action of the crank pin 22.

In order to connect the box slider 23 and the disc 35 for driving the wiper shaft 27, I provide on the inner end of the disc 35 a plurality of pins, in this case three pins 38, 39 and 40, and I provide on the adjacent edge of the box slider 23 a plurality of teeth, in this case two teeth 41 and 42 with suitable interdental recesses 43, 44 and 45.

While I have shown three pins and three interdental spaces co-operating with the same, it is to be understood that the invention is not limited to this particular number as the degree of motion of the oscillatory shaft 27 may be varied by varying the relative proportions and sizes of the pins and teeth. The pins 38, 39 and 40 serve in effect like pinion teeth and the teeth 41 and 42, with their co-operating notches, operate to a certain degree like a rack, although the co-operation which I provide secures a result hereinafter pointed out, namely, that the edges or corners 46 and 47 also serve the same function as the notches or seats 43, 44 and 45 to receive the pins 38, and 40, or part of them, to transmit motion to the wiper shaft.

It is to be noted that instead of the pins such as 38, 39 and 40 suitable teeth might be provided instead. The pins are simpler and more easily constructed and are advantageous. It is to be noted that the circumferential extent of the pins is in the present case less than 360°, but this may be varied. The effective diameter of the pinion formed by the pins 38, 39 and 40 is less than the diameter of the head guiding surface 36 to secure an overhang of the flange of the slider.

The pinion might be made a solid piece instead of being only the pins. In order to secure engagement between the end of the box slider and the pinion the rack on the slider is made so short as to secure effective engagement of the parts. If desired a mutilated solid pinion might be provided to secure the engagement which I have shown. I find that the pins and coarse teeth give better strength and lightness also less friction.

That is to say, the inwardly extending flanges about the track 37 provide on the one side the teeth and notches and on the other side only the corner recesses or seats 46 and 47.

The operation of the device will be clear from a consideration of the construction previously described, and a study of diagrams shown at Figs. 6 and 7.

The motor is controlled by a suitable switch 50 having an operating element, such as the pull handle 51 projecting from the end plate 10, this handle 51 has a reduced cylindrical portion 52 extending through an insulating sleeve 53 and at its inner end the pin 52 is notched as indicated at 54 and 55. These two notches are adapted to register with co-operating springs 56 and 57, the springs in turn being mounted upon suitable insulation and connected in series in the motor circuit, as will be well understood by those skilled in the art.

Figure 4:
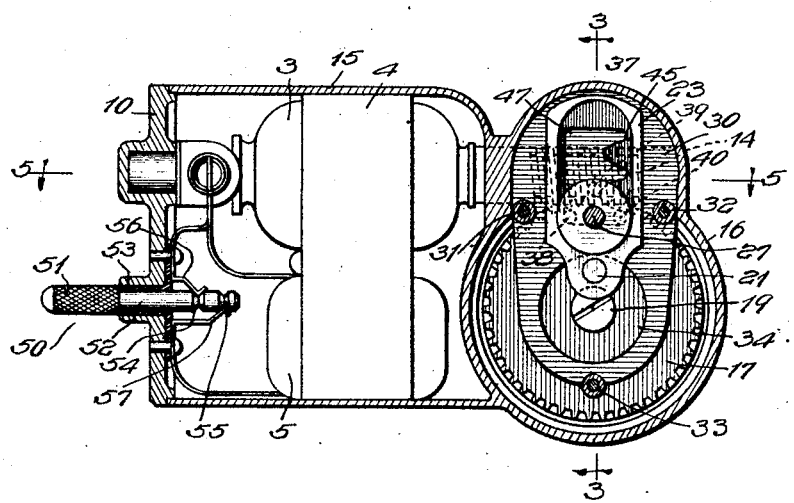
Fig. 4 is a longitudinal cross section taken on the line 4—4 of Fig. 3.
Figure 5:
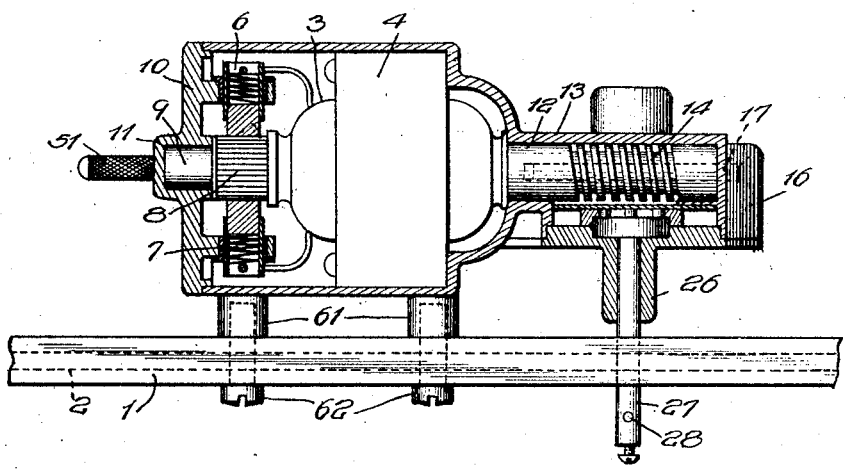
Fig. 5 is a horizontal cross section taken on the line 5—5 of Fig. 4.

When the switch element 50 is in the position shown in Fig. 4 and the motor circuit is closed, the external circuit not being indicated for the sake of clearness, the motor armature 3 is rotated driving the worm 14 and the cooperating worm wheel 17. The space within the housing 16, in which the working parts operate, is packed with grease and hence the bearings of the worm and worm wheel and cooperating parts are maintained in suitable lubricated condition. The worm wheel 17 carries the crank pin 21 and the crank pin carries with it the bearing 22 of the box slider 23, the box slider pivoting upon the cylindrical part 36 of the disc 35. This disc member 35 is suitably connected as by a key or pin to the oscillating shaft 27, so that the shaft 27 and the wiper arm 28, with its connected squeegee 29, partakes of the oscillatory motion of said shaft 27. As the crank pin 21 revolves about the axis of the worm wheel, the box slider 23 partakes of the motion of the same. The portion of the box slider bearing the teeth transmits motion through the pins to the head 35 and thus to the oscillatory shaft 27.

Now I wish to call attention to the fact that in the particular arrangement which I have shown, the pins 38 and 40 co-operate not only with the end interdental spaces on the side of the slider having the teeth 41 and 42, but also these pins co-operate with the seats 46 and 47 upon the opposite side of the slider at the ends of the stroke of said slider. For example, attention is called to the diagrams of Figs. 6 and 7 where the slider is at the end of the stroke. In Fig. 6 when the slider has been pushed towards the head 35 to its fullest extent, the pin 40 is seated in the notch or interdental space 43 and the pin 38 is in the notch or corner 46 and further motion of the pin 21 transmits a push upward on the pin 38 and a pull downward on the pin 40 so as to secure a maximum torque upon the oscillatory shaft at the end of the stroke.

The same thing is true at the opposite end of the stroke, as shown in Fig. 7, when the slider has moved as far away from the head 35 as possible and in this case the pin 38 is in the recess 45 and the pin 40 is in the corner 47 and further motion of the crank pin 21 in the direction indicated by the arrow tends to transmit an upward thrust on the pin 38 and a downward pull upon the pin 40, again giving maximum power to the oscillatory shaft at the end of the stroke. Thus the mechanism is not strained at the end of the stroke where the friction is maximum and furthermore the mechanism has its greatest inherent power at that time. This is highly desirable, because at the end of the stroke the friction of motion is substituted for by the friction of rest and also in many cases there is a tendency to form a ridge at the end of the stroke as, for instance, where ice freezes upon the wind shield and also it sometimes happens that the pressure on the squeegee 29 is sufficient to cause the rubber to be bent to one side by motion of the rocker arm and then the arm must pass over the bent rubber to cause motion in the opposite direction. Hence it is highly desirable that at the reversal of motion of the oscillatory shaft suitable power be provided and also suitable bearings between the parts so that the wear may at this point be a minimum.

The advantage which I secure by clutching the slider and the pinion together to a greater extent at the end of the stroke than in the intermediate part of the stroke is inherent in the structure which I have shown, but the structure may be varied and the advantage still secured by suitable proportioning of the teeth and pins, or by providing a suitably formed pinion and slider where both elements have teeth co-operating with each other.

It will be seen that at all times the box slider 23 is guided for motion of translation and also for angular or pivotal motion upon the extending hub or cylindrical guiding surface 36. The box slider, therefore, serves the threefold function of serving as a cross head for the crank pin 21, serving as a rack for driving the wiper shaft 27, and guiding itself upon said hub or cylindrical guiding surface 36. There is also the additional function secured of serving as a lever at the end of the stroke.

In Figs. 8 and 9 I have shown a modification of the structure in which the motor is placed with its shaft below the worm wheel instead of above the worm wheel, as illustrated in Figs. 1 to 7. In this form of the device the oscillating wiper shaft 27, instead of being mounted directly upon the guiding disc and pinion 35, is connected to a gear 59 which has teeth meshing with suitable co-operating gear teeth 60 formed on the edge of said disc or head 35'. Thus the disc or head 35' functions as a dual form of gear and also as a guiding surface. The teeth 60 are formed at one side to co-operate with the gear 59 which drives the wiper shaft 27, the intermediate portion provides a cylindrical guiding surface 36 just as shown in the previous form; and the opposite face carries the pins 38, 39 and 40 which co-operate with the teeth and seat on the box slider 23. The slider 23 shown in Fig. 8 is identical with the slider shown in the previous modification and it has the same guiding and lever function, the pins 38, 39 and 40 co-operating with the teeth and notches precisely as indicated in the foregoing figures, and particularly as illustrated in Figs. 6 and 7. The only difference between the two embodiments is that the wiper shaft, instead of being directly mounted for driving connection with the head or disc 35', is connected thereto through gear teeth and the gear 59.

In mounting the device shown in Figs. 1 to 7, inclusive, a pair of posts or bosses 61 are formed integral with the housing 15 and clamping screws 62 are passed loosely through the top rail 1 of the wind shield and threaded into the hollow bosses 61 which are suitably tapped to receive them. These bosses 61 are substantially in line with the hub or bearing 26 of the wiper shaft 27, so that the wiper shaft 27 may pass through the top rail 1 on about the same line as the screws 62.

In the form shown in Figs. 8 and 9 the motor shaft is disposed below the worm wheel and the gears 59 and 60 bring the wiper shaft 27 upward to a point adjacent the top of the housing 15' so that the posts 61' may lie in line with the wiper shaft 27 and the screws 62 may clamp the device to the wind shield in the same manner as explained in connection with the device shown in Fig. 1.

I do not intend to be limited to the details shown or described.

I claim:

1. In combination, a housing comprising two separate compartments, the first compartment having an open end, an end plate therefor, an electric motor in said first compartment, said second compartment having an open side, a cover plate therefor, said compartment being connected by a bore, said motor having a shaft in said bore closing the same, a worm on said shaft disposed in said second compartment, a worm wheel journalled in said second compartment and co-operating with said worm, a frame plate connected to and spaced from said cover plate, a crank pin mounted on the worm wheel, an oscillatory wiper shaft journalled in said cover plate, motion transmitting mechanism for transmitting motion from the crank pin to the wiper shaft mounted between said frame plate and said cover plate, said mechanism comprising a slider pivoted on the crank pin and a cooperating oscillating head mounted on the end of the wiper shaft.

2. In combination, a pair of frame plates spaced from each other, an oscillatory shaft journalled in one frame plate, a cylindrical head secured upon said shaft and lying between said plates, a slider having a guide way embracing said cylindrical head and having a flange overlying said head, notches formed in one edge of said flange, pins meshing with said notches, said pins being mounted on said head, and a revolving crank pin having one end of the slider journalled upon the same.

3. In combination, an oscillatory shaft, a rotating crank pin, a cylindrical head upon one end of the shaft, a box slider having a guide way embracing said head, a flange extending over the end of the head, projections on the end of the head and notches in the flange, said projections and notches forming co-operating gear elements, said box slider having a bearing at one end and said bearing embracing said crank pin.

4. In combination, an oscillatory shaft, a rotating crank pin, a cylindrical head upon one end of the shaft, a box slider having a guide way embracing said head, a flange extending over the head, tooth members formed on the end of the head and lying within the diameter of the head, and co-operating teeth formed in the flange of the slider, said slider having a bearing at one end embracing said crank pin.

5. In combination, an oscillatory shaft, a rotating crank pin, a cylindrical head upon one end of the shaft, a box slider having a guide way embracing said head, a flange extending over the end of the head, pins projecting out of the end of the head, said pins lying within the diameter of the head, co-operating teeth being formed in the edge of the flange, and a bearing in the end of the slider for said crank pin.

6. In combination, an oscillatory shaft, a rotating crank pin, a cylindrical head member upon one end of the shaft, a box slider having a guide way embracing said head, said slider having a flange extending over the end of the head, co-operating teeth on the head and in the flange for connecting the head and the slider, the length of the run of teeth on the slider being such as to permit engagement of the teeth of the head with the ends of the guideway of the slider, and a bearing for the crank pin in one end of the slider.

7. In combination, a pair of frame plates held together in parallel alignment, an oscillatory shaft having a cylindrical head disposed between said plates, a co-operating slider having a guide way embracing the head, said slider having an inwardly extending flange lying between the inner end of said head and one of the frame plates, said head having a plurality of pins extending out of the inner end of the head, said flange having notches and teeth co-operating with said pins, and a crank pin journalled in one end of the slider.

8. In combination, an oscillatory shaft, a rotating crank pin, a cylindrical head on the shaft, a box slider having a guide way embracing the head, said head having a plurality of projections forming a pinion of smaller diameter than the diameter of the head, said slider having an inwardly extending flange having teeth co-operating with said pinion and a bearing in the end of the slider co-operating with said crank pin.

In witness whereof, I hereunto subscribe my name this 27th day of January, 1925.

AUGUSTE PINEAU.